United States Patent
Miller et al.

(10) Patent No.: US 10,848,751 B2
(45) Date of Patent: Nov. 24, 2020

(54) INTERPUPILLARY DISTANCE ADJUSTMENT IN A HEAD-MOUNTED DISPLAY

(71) Applicant: Facebook Technologies, LLC, Menlo Park, CA (US)

(72) Inventors: Robin Michael Miller, Redmond, WA (US); Mark Alan Tempel, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 263 days.

(21) Appl. No.: 15/599,901

(22) Filed: May 19, 2017

(65) Prior Publication Data

US 2018/0338130 A1 Nov. 22, 2018

(51) Int. Cl.
| | |
|---|---|
| H04N 13/332 | (2018.01) |
| H04N 13/327 | (2018.01) |
| H04N 13/344 | (2018.01) |
| H04N 13/398 | (2018.01) |
| G02B 27/01 | (2006.01) |

(52) U.S. Cl.
CPC ....... *H04N 13/332* (2018.05); *G02B 27/0176* (2013.01); *H04N 13/327* (2018.05); *H04N 13/344* (2018.05); *H04N 13/398* (2018.05)

(58) Field of Classification Search
CPC .... G06F 3/012; H04N 13/332; H04N 13/327; H04N 13/344; H04N 13/398; G02B 27/0176; G02B 2027/0181
See application file for complete search history.

(56) References Cited

U.S. PATENT DOCUMENTS

| | | | | |
|---|---|---|---|---|
| 2007/0214551 A1* | 9/2007 | Teetzel | ..................... | A42B 3/04 2/422 |
| 2010/0177168 A1* | 7/2010 | Hu | ........................ | H04N 13/344 348/47 |
| 2010/0254743 A1* | 10/2010 | Cong | ..................... | H04M 1/23 400/488 |
| 2014/0300874 A1* | 10/2014 | Chen | .................... | G03B 21/145 353/119 |
| 2015/0253574 A1* | 9/2015 | Thurber | ............. | G02B 27/0172 359/630 |
| 2016/0050345 A1* | 2/2016 | Longbotham | ........ | G02B 27/017 348/47 |
| 2016/0062125 A1* | 3/2016 | Baek | .................. | G02B 27/0176 361/679.01 |

(Continued)

*Primary Examiner* — Jeff Piziali
(74) *Attorney, Agent, or Firm* — Fenwick & West LLP (57) ABSTRACT

A device is configured to adjust interpupillary distance in a HMD. The device include a fixed plate, a button assembly, a spring, and a gear. The spring biases the button assembly towards the fixed plate to prevent movement of the button assembly. A button of the button assembly can be pressed beyond a threshold distance to disengage the button assembly and the fixed plate. Consequently, the button assembly can be moved relative to the fixed plate. The gear meshes with a gear rack of the button assembly and is associated with two display assemblies of the HMD. The movement of the button assembly drives the gear to rotate. The rotation of the gear causes the two display assemblies of the HMD to move in opposite directions. The movement of one of the display assemblies relative to the other display assembly adjusts interpupillary distance in the HMD.

12 Claims, 8 Drawing Sheets

(56) References Cited

U.S. PATENT DOCUMENTS

| | | | | |
|---|---|---|---|---|
| 2016/0292850 A1* | 10/2016 | Perez | ................ | G06F 3/005 |
| 2016/0320612 A1* | 11/2016 | Zhang | ................ | G02B 27/0006 |
| 2016/0334628 A1* | 11/2016 | Lyons | ................ | G02B 27/0172 |
| 2017/0017085 A1* | 1/2017 | Araki | ................ | G09G 5/00 |
| 2017/0052393 A1* | 2/2017 | Kweon | ................ | G02C 13/003 |
| 2017/0094816 A1* | 3/2017 | Yun | ................ | G02B 27/022 |
| 2018/0003984 A1* | 1/2018 | Lai | ................ | A42B 7/00 |

* cited by examiner

Bias, by a spring, a button assembly towards a fixed plate
810

Press a resilient layer of the button assembly against a plurality of teeth of the fixed plate to prevent movement of the button assembly relative to the fixed plate
820

Responsive to pressing of a button of the button assembly by a user in a first direction, disengage the resilient layer of the button assembly from the plurality of teeth of the fixed plate
830

Responsive to moving the button in a second direction perpendicular to the first direction along a slot formed in the fixed plate by a user, causing a rotation of a first gear meshing with a first gear rack of the button assembly
840

Responsive to releasing the button of the button assembly by a user, press the resilient layer of the button assembly against the teeth of the fixed plate to prevent movement of the button assembly relative to the fixed plate and rotation of the first gear
850

FIG. 8

INTERPUPILLARY DISTANCE ADJUSTMENT IN A HEAD-MOUNTED DISPLAY

BACKGROUND

The present disclosure generally relates to head-mounted displays (HMD), and specifically to a device for adjusting interpupillary distance in HMD.

People have different interpupillary distances (IPD). For comfortable use, it is advantageous have a mechanism in a HMD to adjust interpupillary distance. Existing mechanism for adjusting the interpupillary distance in a HMD typically enable adjustment of interpupillary distance on a discrete basis. That is, a user may be allowed to select one of a plurality of discrete interpupillary distance settings. Such discrete interpupillary distance setting may not be sufficient to provide fine tuning and thereby degrade the user experience of HMD.

SUMMARY

Embodiments relate to a HMD with a mechanism for continuously adjusting of an interpupillary distance. The HMD includes two display assemblies that display images to the two eyes of a user of the HMD, respectively. Each display assembly has an exit pupil. The exit pupil is a virtual aperture in the display assembly and only image light passing through this virtual aperture can exit the display assembly and enter into the eye of the user. Interpupillary distance in the HMD is the distance between the two exit pupils. The IPD adjustment device adjusts interpupillary distance in the HMD through driving motions of the two display assemblies.

In some embodiments, the IPD adjustment device includes a fixed plate, a button assembly, a spring, and a gear. The fixed plate is formed with a slot and has a surface with teeth ("tooth surface"). The fixed plate is associated with a button assembly. The button assembly includes a button, a resilient layer, and a gear rack attached to the button. At least part of the button is received in the slot of the fixed plate. At least some of the part of the button that is not received in the slot is exposed to the user. The resilient layer of the button assembly has a surface facing the tooth surface of the fixed plate. The spring biases the button assembly towards the fixed plate and presses the resilient layer against the tooth surface of the fixed plate to prevent movement of the button assembly relative to the fixed plate. The gear meshes with the gear rack of the button assembly and associates with the display assemblies of the HMD.

The user may push the button beyond a threshold distance to disengage the tooth surface of the fixed plate from the resilient layer of the button assembly. After the tooth surface is disengaged from the resilient layer, the user may move the button along the slot of the fixed plate. Because the button is attached to the gear rack, the gear rack moves with the button. The moving gear rack rotates the gear that meshes with the gear rack. The rotation of the gear causes motions of the display assemblies, resulting in adjustment of the interpupillary distance in the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to an interpupillary distances (IPD) adjustment device for adjusting interpupillary distance of a head-mounted display (HMD). The IPD adjustment device includes a fixed plate, a button assembly, a spring, and a gear. In some embodiments, the IPD adjustment device may further include a spring sleeve that encloses at least part of the spring. The spring biases the button assembly towards the fixed plate to prevent movement of the button assembly. A user may press a button of the button assembly to disengage the button assembly from the fixed plate, and then slide the button to move the button assembly relative to the fixed plate. This causes two display assemblies to move in opposite directions and thereby adjust interpupillary distance in the HMD.

Figure 1:
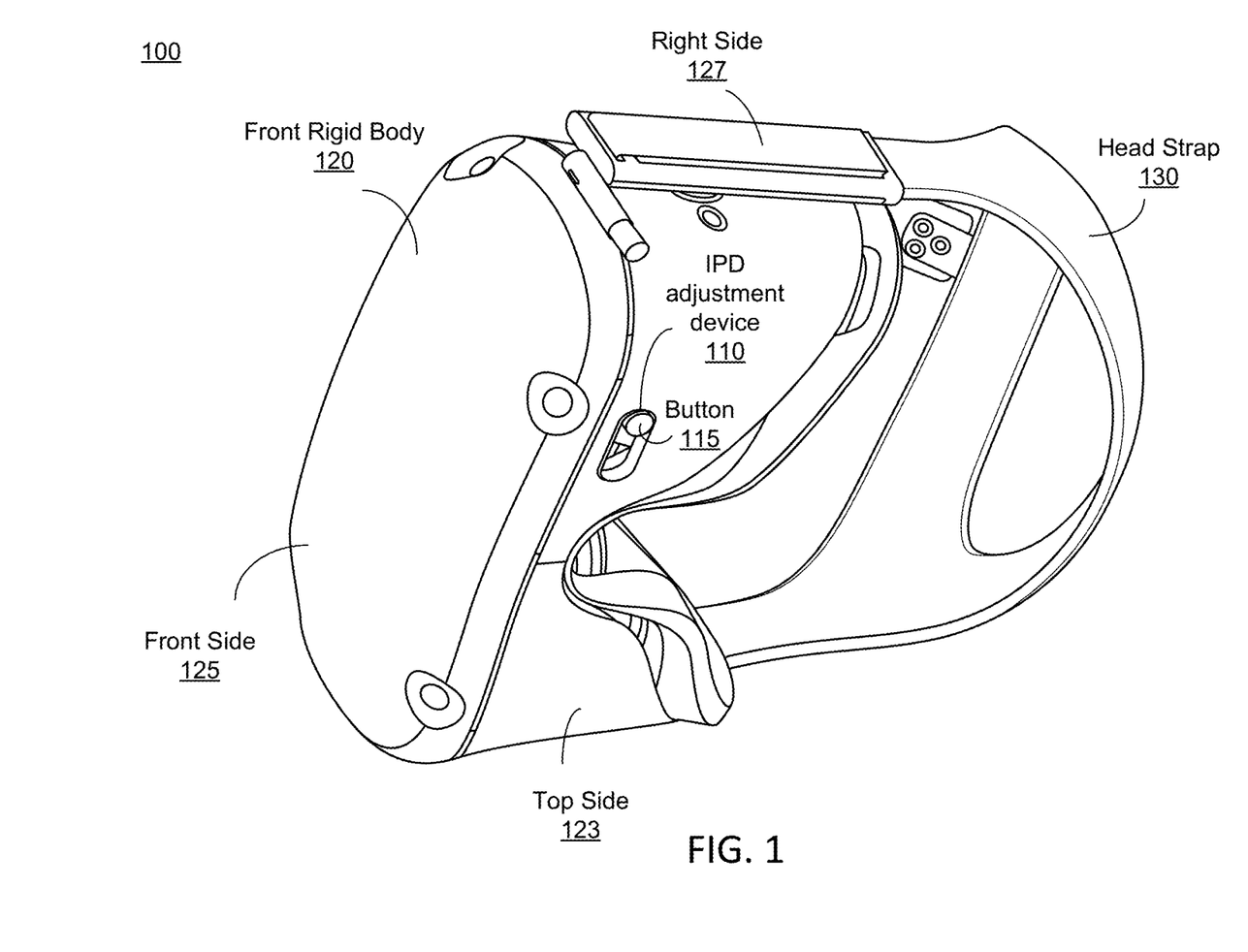
FIG. 1 is a perspective view of a HMD including an IPD adjustment device, in accordance with an embodiment.

FIG. 1 is a perspective view of a HMD 100 including an IPD adjustment device 110, in accordance with an embodiment. In the embodiment of FIG. 1, the HMD further includes a front rigid body 120 and a head strap 130. FIG. 1 shows a bottom side 123, front side 125, and right side 127 of the front rigid body 120. The front rigid body 120 also has a top side, a back side, and a left side, even though not shown in FIG. 1. The band 130, in some embodiments, has adjustable length. Between the front rigid body 120 and the head strap 130 of the HMD 100, there is sufficient space allowing a user to mount the HMD 100 onto the user's head. In other embodiments, the HMD 100 may include additional, fewer, or different components. For example, the HMD 100 includes eyeglasses temples and temples tips, instead of the band 130.

The HMD 100 is a head-mounted display that presents media to a user comprising virtual and/or augmented views of a physical, real-world environment with computer-generated elements. Examples of the media presented by the HMD 100 include images (e.g., 2D or 3D images), video (e.g., 2D or 3D video), audio, or some combination thereof. Images and video can be presented to each of the eyes of the user by using a first display assembly 300 and a second display assembly 720 (shown in FIGS. 6 and 7) of the HMD 100. The first display assembly 300 and the second display assembly 720 can be enclosed in the front rigid body 120 of the HMD 100. The HMD 100 has two eye box regions for the eyes of the user. The eye box regions includes exit pupils 380 and 780 (shown in FIGS. 3 and 6) of the display assemblies.

The HMD 100 may be part of, e.g., a VR system, an AR system, a MR system, or some combination thereof. In embodiments that describe AR system and/or a MR system, portions of the HMD 100 that are between a front side 125 of the HMD 100 and an eye of the user are at least partially transparent (e.g., a partially transparent electronic display). In embodiments that describe AR system and/or a MR system, portions of the HMD 100 that are between a front side 125 of the HMD 100 and an eye of the user are at least partially transparent (e.g., a partially transparent electronic display).

One of many advantages of the IPD adjustment device 110 is that it can adjust the distance between the exit pupils 380 and 780 of the HMD 100 in a non-discrete and continuous manner to match the interpupillary distance of a user. The interpupillary distance of the HMD 100 refers to the distance between the centers of the exit pupils 380 and 780 of the two display assemblies 300 and 720 (shown in FIGS. 6, and 7) of the HMD 100. Because only image light passing through the exit pupils 380 and 780 can exit the display assemblies 300 and 720, the user's eye pupils are to be positioned within the exit pupils 380 and 780.

In one embodiment, the IPD adjustment device 110 includes a button 115 exposed to enable pushing and moving of the button by the user. The movement of the button 115 causes rotation of a gear in the IPD adjustment device 110, and further causes linear motions of the first and second display assemblies 300 and 720 in the HMD 100, as described below in detail with reference to FIGS. 6 and 7. The degree of the interpupillary distance adjustment is determined by how much the user moves the button 115.

In FIG. 1, the IPD adjustment device 110 is located on the bottom side 123 of the front rigid body 120 of the HMD 100. In alternative embodiments, the IPD adjustment device 110 may be located at a different position on the HMD 100. More details about the IPD adjustment device 110 are discussed in conjunction with FIGS. 2A-B.

Figure 2A:
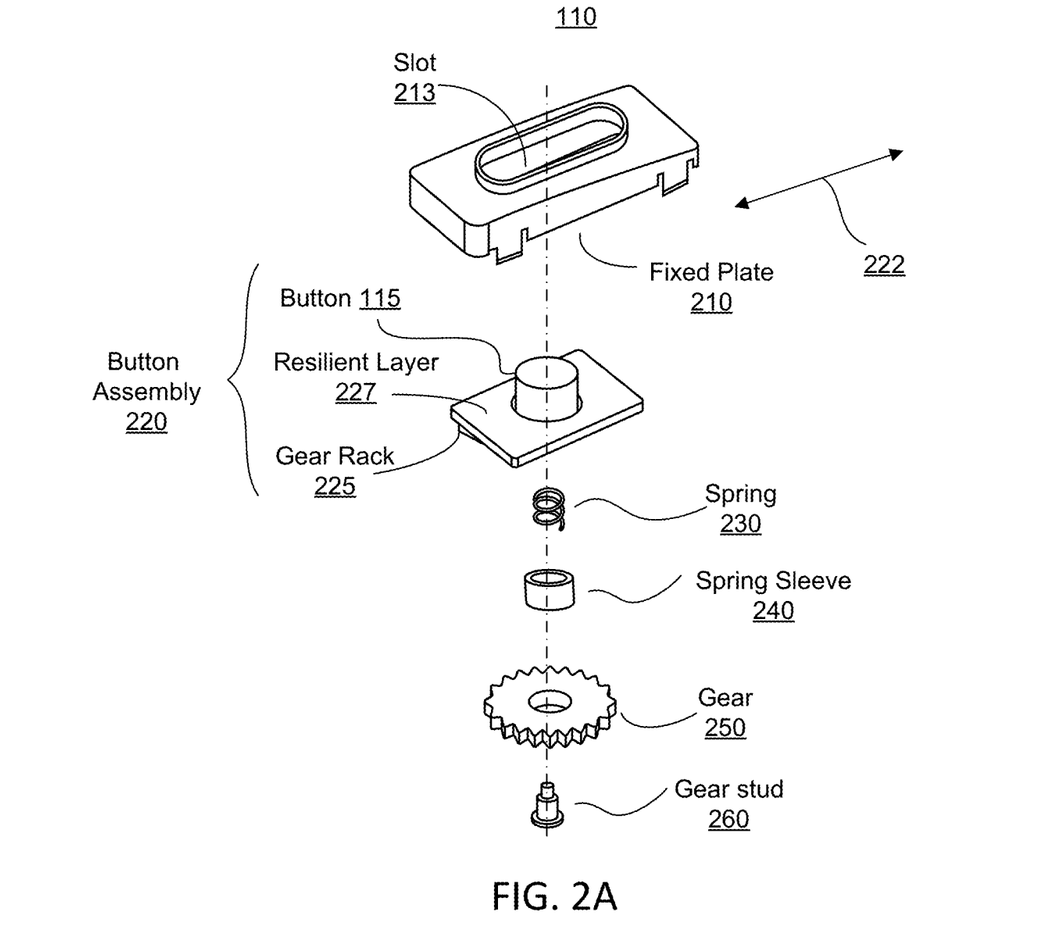
FIG. 2A is an exploded view illustrating components of the IPD adjustment device, in accordance with an embodiment.

FIG. 2A is an exploded view illustrating components of the IPD adjustment device 110, in accordance with an embodiment. As illustrated in FIG. 2A, the IPD adjustment device 110 includes a fixed plate 210, a button assembly 220, a spring 230, a sleeve 240, a gear 250, and a gear stud 260. The button assembly 220 is inserted into the fixed plate 210 from the bottom of the fixed plate 210. The spring 230, along with the spring sleeve 240, is enclosed in a hollow portion of the button assembly 220. The gear 250 attaches to the bottom of the button assembly 220. The gear stud 260 is inserted into the hole of the gear 250. In other embodiments, the IPD adjustment device 110 may have fewer, additional, or different components. For example, the IPD adjustment device 110 may not include the sleeve 240. Also, the gear 250 and the gear stud 260 may be one piece, instead of two pieces.

The fixed plate 210 is fixed on the bottom side 123 of the front rigid body 120 or another portion of the HMD 100. It does not move relative to the HMD 100 with movement of other components of the IPD adjustment device 110. The fixed plate 210 includes a slot 213 and a tooth surface 217 with multiple teeth, as described below with reference to FIG. 2B.

The button assembly 220 may include, among other components, the button 115, a gear rack 225 and a resilient layer 227. At least part of the button 115 is received in the slot 213 of the fixed plate 210, so that the button 115 can be exposed to the user of the HMD 100. The gear rack 225 is attached to the button 115, so that the gear rack 225 moves with the button 115, as described below in detail with reference to FIG. 2C. The resilient layer 227 has a surfaced that faces the tooth surface 217 of the fixed plate 210. When the button 115 is not pressed, the resilient layer 227 can grip the teeth on the tooth surface 217 of the fixed plate 210, preventing the button assembly from moving.

The spring 230 biases the button assembly 220 towards the fixed plate 110 and presses the resilient layer 227 of the button assembly 220 against the tooth surface of the fixed plate 110 to prevent movement of the button assembly 220 relative to the fixed plate 210 when the button 115 is not pressed. In some embodiments, the spring 230 is a compression spring that is designed to operate with a compression load, so the spring gets shorter when the compression load is applied to it. When the user presses the button 115 into the slot and away from the fixed plate 210, the spring 230 is compressed. When the button 115 is pressed beyond a threshold distance (i.e., the compression of the spring 230 is beyond the threshold distance), the button assembly 220 (specifically, the resilient layer 227) disengages from the fixed plate 210 (specifically, the tooth surface 217) and enables the button assembly 220 to slide relative to the fixed plate 210. For example, the user may move the button 115 along the longitudinal direction 222 along the slot 213 of the fixed plate 210.

In one embodiment, the outer diameter of the spring 230 is no larger than the diameter of the button 115 so that the spring 230 can be received in the hollow portion of the button 115 with the sleeve 240 in-between. The spring 230 may have a shape of cone, hour glass, battery, barrel, or reduced ends.

Figure 2B:
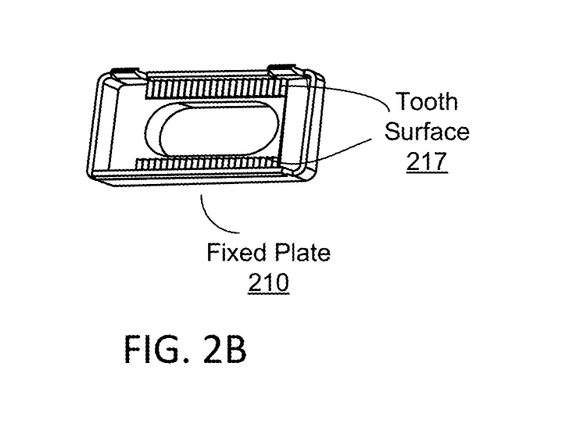
FIG. 2B is a rear view of a fixed plate of FIG. 2A, in accordance with an embodiment.
Figure 2C:
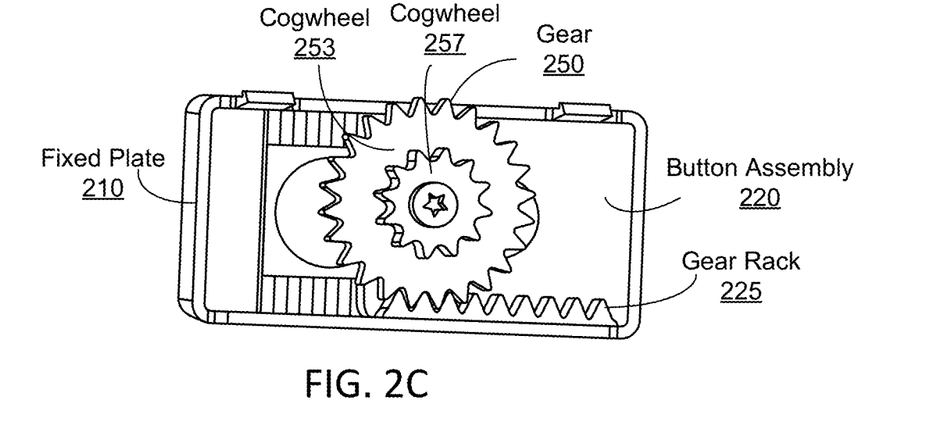
FIG. 2C is a perspective view of the IPD adjustment device in an assembled state, in accordance with an embodiment.

The gear 250 has two cogwheels 253 and 257, as illustrated in FIG. 2C. The two cogwheels 253 and 257 are attached together and share the same center of rotation. Thus, when one of the two cogwheels 253 and 257 rotates, the other cogwheel rotates at the same time with the same amount of rotation. The cogwheel 253 is closer to the fixed plate 210 and has a larger radius than the cogwheel 257. The cogwheel 257 meshes with the gear rack 225 of the button assembly 220. So that movement of the gear rack 225 can cause rotation of the gear 250, i.e., both of the two cogwheels 253 and 257.

The gear stud 260 is inserted into a center hole of the gear 250 to rotatably fix the gear 250. The gear 250 and the gear stud 260 can be made of metal, polymer, composite material, or any combination thereof.

FIG. 2B is a rear view of a fixed plate 210 of FIG. 2A, in accordance with an embodiment. The tooth surface 217 includes two arrays of teeth on the longitudinal sides of the fixed plate 210. Alternatively, the tooth surface 217 can have teeth on a larger or smaller portion of the fixed plate 210. When no external force is applied to the button 115, the tooth surface 217 bites into the resilient layer 227 and prevents the resilient layer 227 (and hence, the button assembly 220) from sliding relative to the fixed plate 210.

FIG. 2C is a perspective view of the IPD adjustment device 110 in an assembled state, in accordance with an embodiment. As shown in FIG. 2C, the gear rack 225 includes an array of cogs that meshes with the cogwheel 253. As the button 115 is pressed and moved relative to the fixed plate 210, the cogwheel 253 rotates about its axis, which also rotates the cogwheel 257 fixed to the cogwheel 253. The rotation of the cogwheel 253 cause the display socket 320 to slide, as described below in detail with reference to FIG. 4. In some embodiments, the button 115 and the gear rack 225 can both be attached on a plate of the button assembly 220.

Figure 3A:
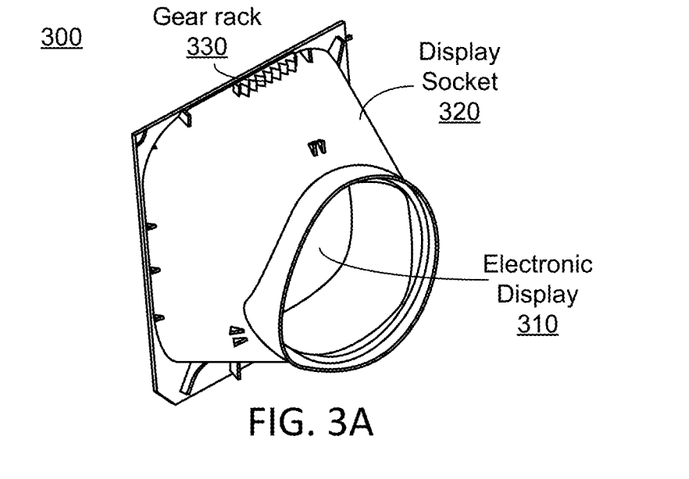
FIG. 3A is a perspective view of a display assembly of the HMD, in accordance with an embodiment.
Figure 3B:
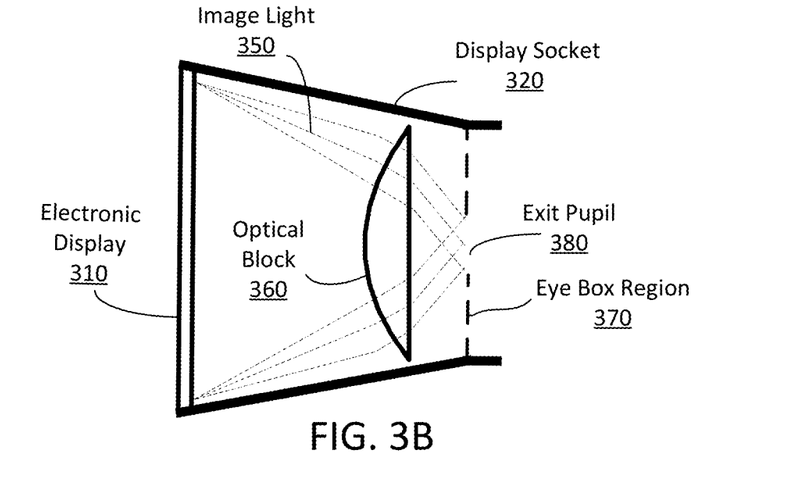
FIG. 3B is a cross-sectional view of the first display assembly, in accordance with an embodiment.

FIG. 3A is a perspective view of a first display assembly 300 of the HMD 100, in accordance with an embodiment. FIG. 3B is a cross-sectional view of the first display assembly 300, in accordance with an embodiment. In the embodiment of FIGS. 3A-B, the first display assembly 300 includes an electronic display 310, a display socket 320, and a gear rack 330. In an alternative embodiment, the first display assembly 300 may include additional, fewer or different components.

The electronic display 310 displays images (e.g., 2D or 3D images) to the user. In various embodiments, the electronic display comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, a micro light emitting diode (mLED), an active-matrix organic light-emitting diode (AMOLED) display, a transparent organic light emitting diode (TOLED) display, some other display, or some combination thereof. The electronic display 310 is attached to one end of the display socket 320. Image light 350 presented by the electronic display 310 goes through the display socket 320 before arrives at an eye of the user.

The display socket 320 includes an eye box region 370 where the eye of the user can be positioned. The eye box region 370 has the exit pupil 380 of the display assembly 330. Thus, the user's eye can receive image light 350 presented by the electronic display 310 when it is positioned in the eye box region 370. As shown in FIG. 3A, the display socket 320 has a frustum shape and may enclose an optical block 360 to direct light from the electronic display 310 to an exit pupil 380 of the HMD, where the eye of the user would be located. In one embodiment, the optics block 360 is an optical element, such as an aperture, a Fresnel lens, a convex lens, a concave lens, a filter, or any other suitable optical element that affects the image light emitted from the electronic display.

The gear rack 330 meshes with the cogwheel 257 of the IPD adjustment device 110 to move the display socket 320 so that the distance between the display socket 320 can be adjusted according to the user's the interpupillary distance. The rotation of the gear 250 drives the gear rack 330 and the display socket 320 to move along with the gear rack 330. The movement of the display socket 320 changes location of the exit pupil 380 of the display assembly 300.

The HMD 100 includes a second display assembly 720 (shown in FIGS. 6 and 7) having a second exit pupil 780 for the other eye of the user. In some embodiments, the second display assembly 720 of the HMD 100 includes a second display socket and a second electronic display that is attached to one end of the display socket and displays images to the other eye of the user. But the second display assembly 720 may not include a gear rack similar to the gear rack 330. In one embodiment, the first display assembly 300 and the second display assembly 720 move in a symmetric manner, meaning they move in opposite directions with the same amount of traveling distance. The movement of the first display assembly 300 relative to the movement of the second display assembly 720 changes the distance between their exit pupils 380 and 780, and accordingly, changes interpupillary distance of the HMD 100, as described below in detail with reference to FIGS. 6 and 7.

Figure 4:
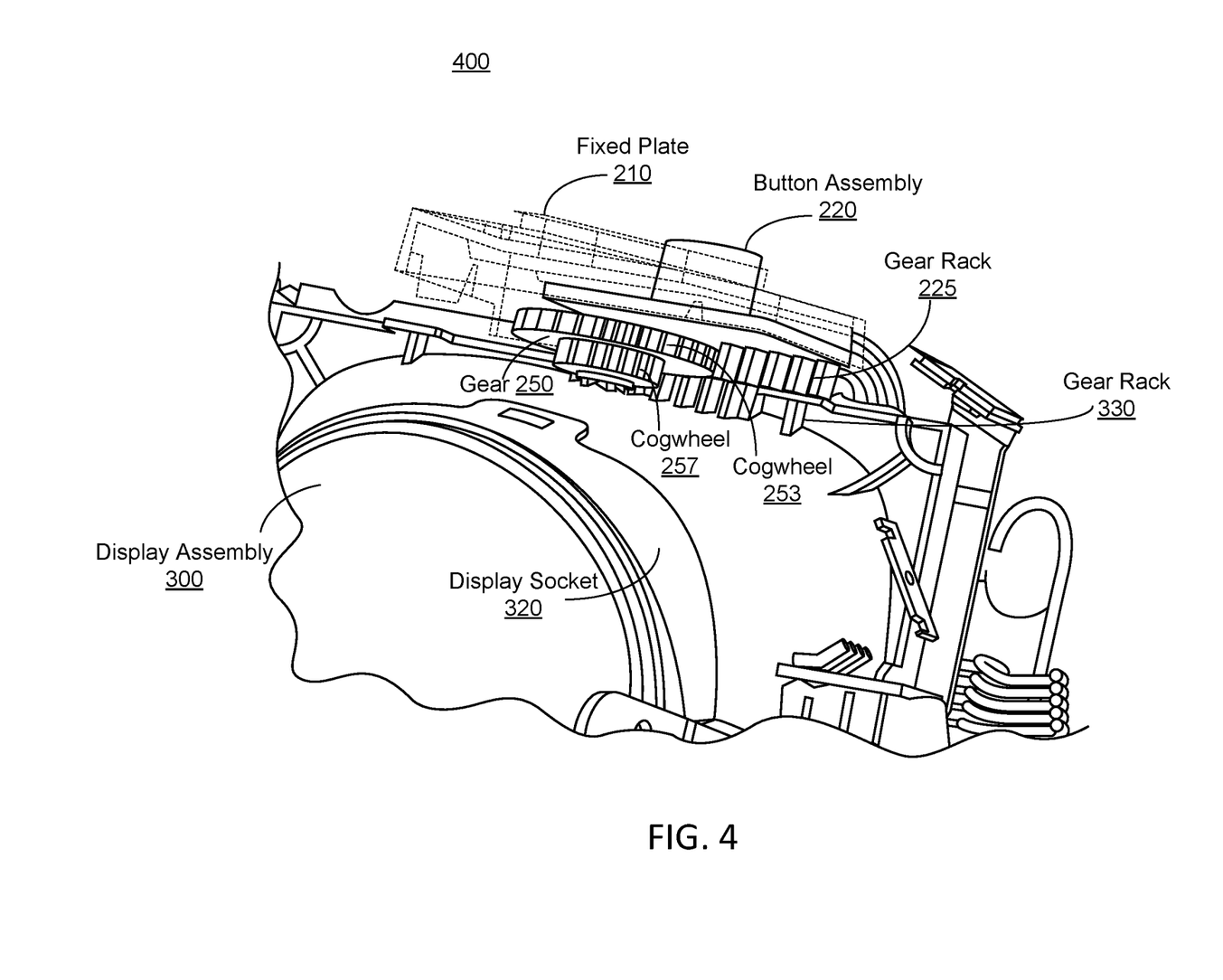
FIG. 4 is a rear view of a portion of the HMD where the IPD adjustment device is located, in accordance with an embodiment.

FIG. 4 is a rear view of a portion of the HMD 100 where the IPD adjustment device 110 is located, in accordance with an embodiment. In the embodiment of FIG. 4, the cogwheel 253 of the gear 250 meshes with the gear rack 225 of the button assembly 220. The cogwheel 257 of the gear 250 meshes with the gear rack 330 of the display assembly 300. With this configuration, the movement of the gear rack 225 causes rotation of the cogwheels 253 and 257. Further, the rotation of the cogwheel 257 causes movement of the gear rack 330 and the display assembly 300. Because the cogwheel 253 has a larger radius than the cogwheel 257, the travelling distance of the gear rack 225 is larger than the travelling distance of the gear rack 330. In one embodiment, the ratio of the traveling distance of the gear rack 225 to the travelling distance of the gear rack 330 equals the ratio of the radius of the cogwheel 253 to the radius of the cogwheel 257. Accordingly, the amount of interpupillary distance adjustment due to the amount of movement of the button of the button assembly at least in part depends on the ratio of the radius of the cogwheel 253 to the radius of the cogwheel 257.

Figure 5:
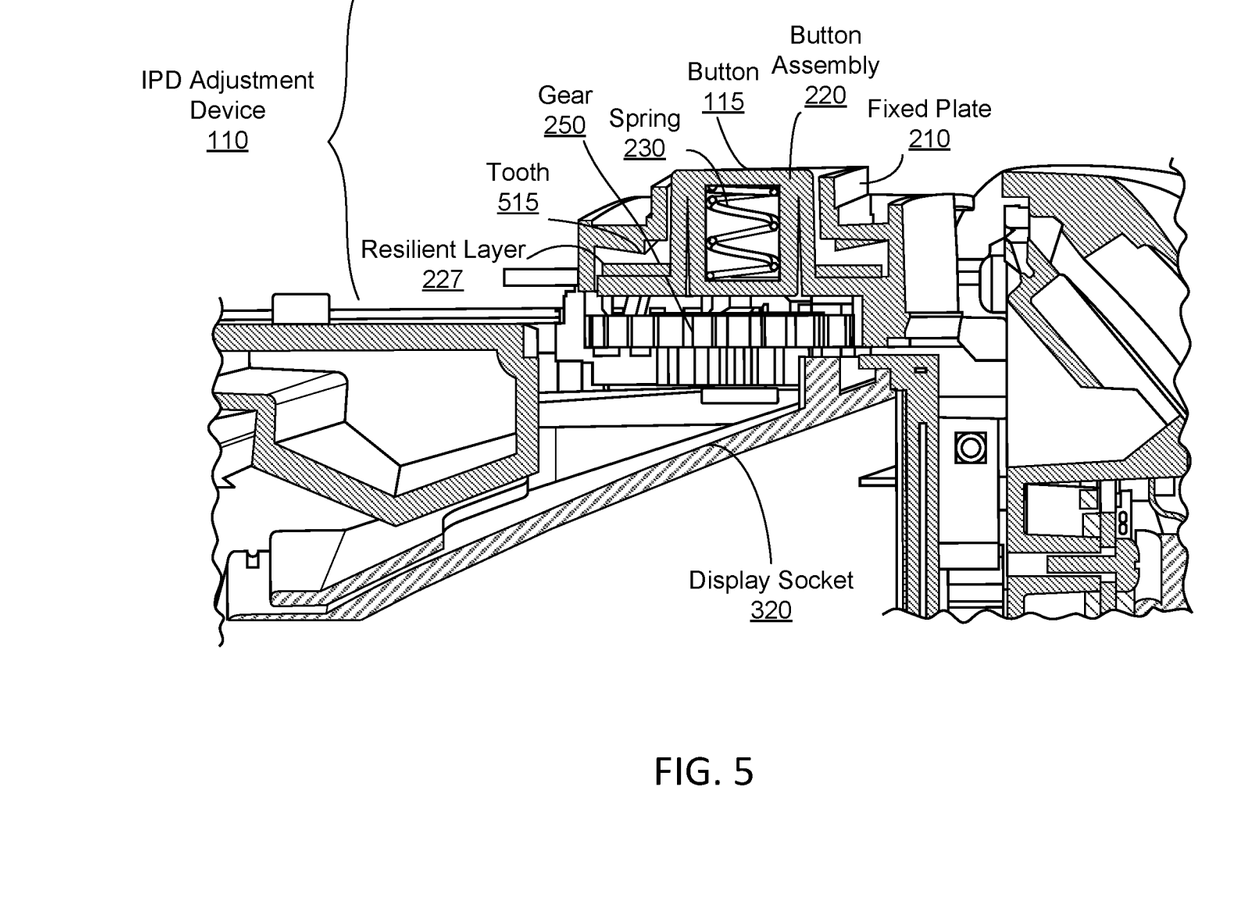
FIG. 5 is a cross-sectional view of the HMD illustrating an IPD adjustment device, in accordance with an embodiment.

FIG. 5 is a cross-sectional view of the HMD 100 illustrating the IPD adjustment device 110, in accordance with an embodiment. The IPD adjustment device 110 is included in a HMD 550. In FIG. 5, a spring 230 of the IPD adjustment device 110 biases the button assembly 220 towards a fixed plate 210 of the IPD adjustment device 110. The fixed plate 210 has a plurality of teeth on one of its surface. The teeth can grip a resilient layer 227 of the button assembly 220. In some embodiments, the resilient layer 227 includes a piece of rubber or other type material with elasticity beyond a threshold value. The teeth of the fixed plate 210 are stiff. For example, the teeth are made of a stiff polymer, metal or ceramic. When the spring 230 biases the button assembly towards a fixed plate 210, at least some of teeth presses the resilient layer 227. The resilient layer 227 deforms to resist the force from the teeth. Consequently, the engagement of the teeth and the resilient layer locks the button assembly 220 from moving relative to the fixed plate 210. As shown in FIG. 5, a tooth 515 of the fixed plate 210 is pressing the resilient layer 227 of the button assembly 220. The resilient layer 227, which originally has a flat surface, is dented to receive the tooth 515.

When a user presses a button 227 of the button assembly 220 beyond a threshold distance, the resilient layer 227 moves down and consequently disengages the teeth of the fixed plate 210. Thus, the teeth cannot press the resilient layer 227. The resilient layer 227 returns to its original shape. The user, at the same time, can move the button 115 to adjust interpupillary distance in the HMD 550. Once an appropriate interpupillary distance is achieved, the user may release the button 115. Upon the user's releasing of the button 115, the resilient layer 227 moves back up and grips the teeth of the fixed plate 210. Again, the engagement of the teeth and the resilient layer locks the button assembly 220 from moving relative to the fixed plate 210. The interpupillary distance in the HMD 550 cannot be changed.

Figure 6:
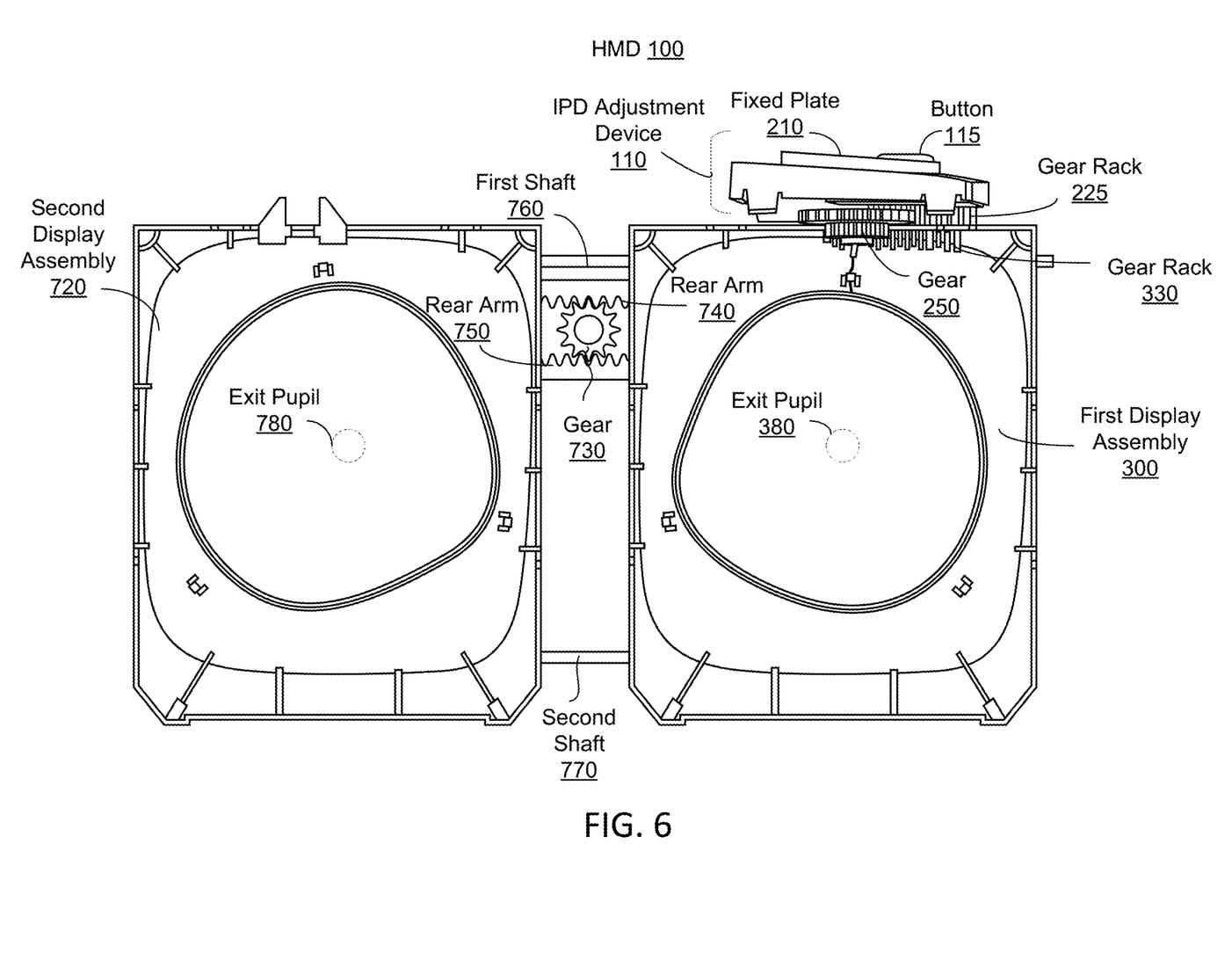
FIG. 6 is a rear view of components of the HMD including the IPD adjustment device and shafts along which the display assemblies slides, in accordance with an embodiment.
Figure 7:
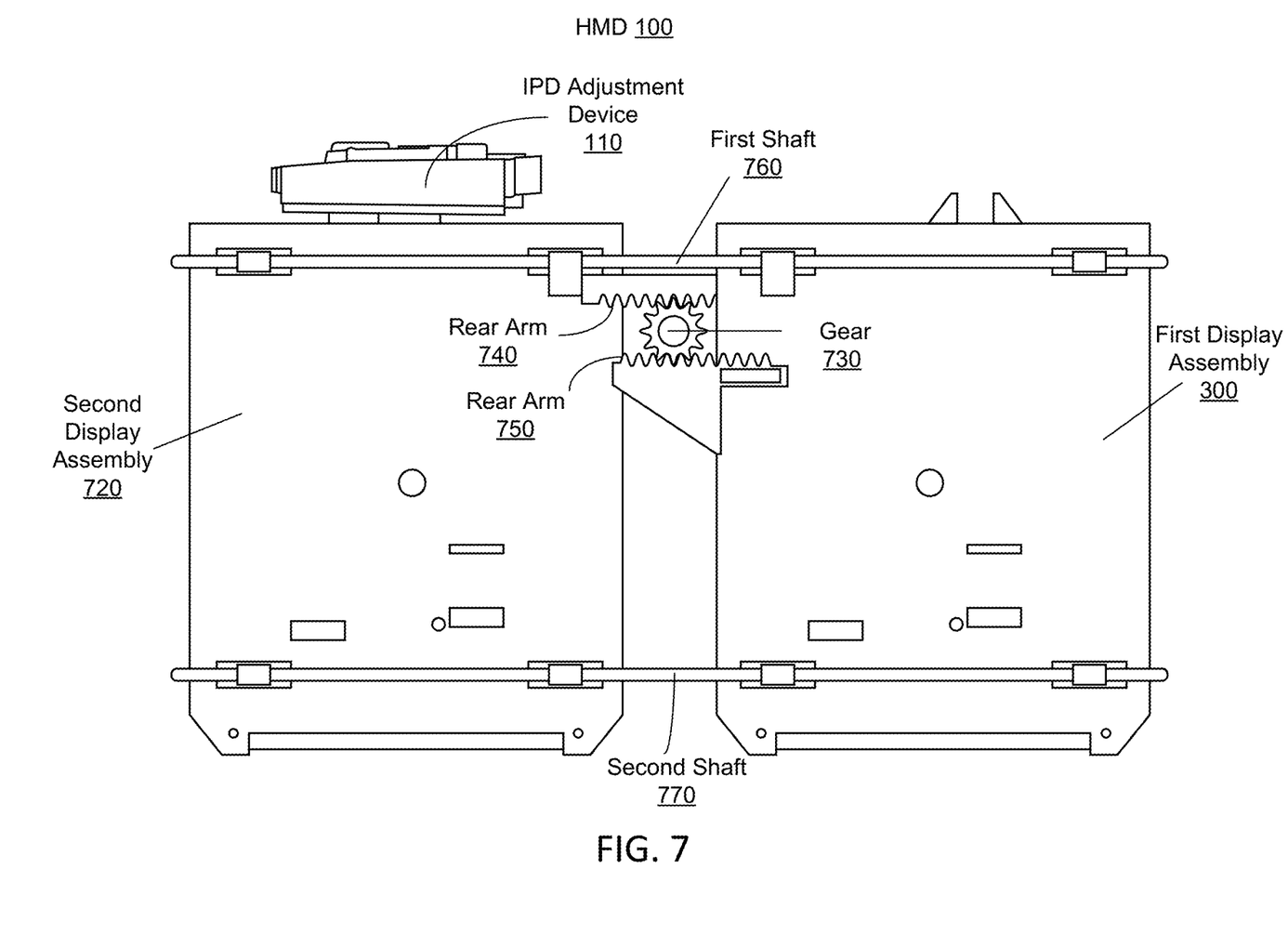
FIG. 7 is a front view of the components as illustrated in FIG. 6, in accordance with an embodiment.

FIG. 6 and FIG. 7 illustrate components of the HMD 100 to move the two display assemblies 300 and 720 in a symmetric manner, according to one embodiment. The HMD 100 includes the first display assembly 300, a second display assembly 720, two rear arms 740 and 750, a first shaft 760, a second shaft 770, and a second gear 730. In alternative embodiments, the HMD 100 includes additional or different components.

The button 115 of the IPD adjustment device 110 can be moved relative to the fixed plate 210 when it is being pressed down beyond a threshold distance. The gear rack 225 is attached to the button 115 and therefore, can move with the button 115 and have the same traveling distance as the button. The gear 250 is meshed with the gear rack 225. When the gear rack 250 moves, the gear rack 225 drives the gear 250 to rotate. The first gear 660 also meshes with a second gear rack 740 of the first display assembly 300. Thus, the rotation of the gear 250 can cause the first display assembly 300 to move. Because the gear rack 250 and the gear rack 330 are on the same side of the gear 250, the first display assembly 300 moves in the same direction as the button 115.

The two display assemblies 300 and 720 are associate with two shafts: a first shaft 760 and a second shaft 770. The first shaft 760 is slidably attached to upper portions of the two display assemblies 300 and 720; while the second shaft 770 is slidably attached to lower portions of the two display assemblies 300 and 720. The two display assemblies 300 and 720 can move along each shaft.

A rack arm 740 is attached on the first display assembly 300. And another rack arm 750 is attached on the second display assembly 720. FIG. 7 shows attachment of the rack arms 740 and 750 on the display assemblies 300 and 720. Between the first display assembly 300 and the second display assembly 720, there is the second gear 730. The second gear 730 meshes with the rack arms 740 and 750. Because the rack arms 740 is attached on the first display assembly 300, it moves when the first display assembly 300 moves. The movement of the rack arm 740 drives the second gear 730 to rotate, which causes movement of the rack arm 750 and the second display assembly 720. As the rack arm 740 and the rack arm 750 are on opposite sides of the second gear 730, the rack arm 750 (and the second display assembly 720) moves in a direction opposite to the moving direction of the rack arm 740 (and the first display assembly 300). But the traveling distance of the first display assembly 300 is the same with the traveling distance of the second display assembly 720.

Thus, responsive to moving of the button and rotating of the gear 250, the gear 720 rotates and moves the first and second assemblies 300 and 720 in a symmetric manner. The movement of the first display assembly 300 relative to the second display assembly 720 changes the distance between their exit pupils 380 and 780, i.e., adjusts the interpupillary distance in the corresponding HMD. In one embodiment, the rotation of the first gear 250 causes linear motions of the first and second display assemblies 300 and 720.

A user may move the button 115 of the IPD adjustment device 110 in one direction to increase the interpupillary distance in the HMD and move the button 115 in the opposite direction to decrease the interpupillary distance in the HMD. In the embodiment of FIGS. 6 and 7, when the button 115 is moved towards the second display assembly 720, the interpupillary distance is decreased. After a proper interpupillary distance is obtained, a user may release the button to prevent the button from further moving.

Figure 8:
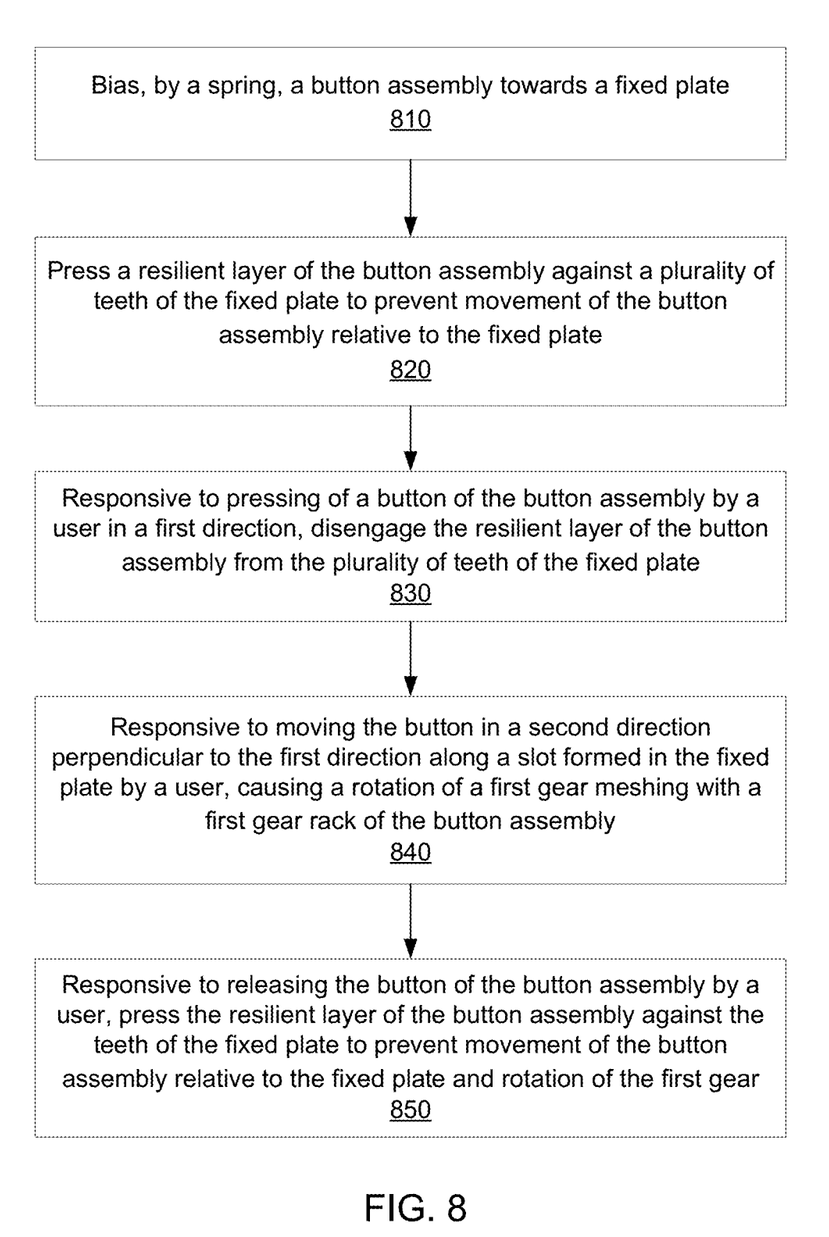
FIG. 8 is a flow chart illustrating a process of adjusting interpupillary distance in a HMD, in accordance with an embodiment.

FIG. 8 is a flow chart illustrating a process of adjusting interpupillary distance in a HMD, in accordance with an embodiment. In some embodiments, the process is performed by an IPD adjustment device 110. In alternative embodiments, the process can be performed by another device.

The IPD adjustment device 110 biases 810, by a spring, a button assembly towards a fixed plate. The IPD adjustment device 110 presses 820 a resilient layer of the button assembly against a plurality of teeth of the fixed plate to prevent movement of the button assembly relative to the fixed plate. A user of the HMD may press a button of the button assembly in a first direction. Responsive to the pressing of the button by the user, the IPD adjustment device 110 disengages 830 the resilient layer of the button assembly from the plurality of teeth of the fixed plate. A user may move the button in a second direction perpendicular to the first direction along a slot formed in the fixed plated. Responsive to the moving of the button by the user, the IPD adjustment device 110 causes 840 a rotation of a first gear that meshes with a first gear rack of the button assembly. A user may also release the button. Responsive to the releasing of the button by a user, the IPD adjustment device 110 presses 850 the resilient layer of the button assembly against the teeth of the fixed plate to prevent movement of the button assembly relative to the fixed plate and rotation of the first gear.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A device for adjusting interpupillary distance in a head-mounted display, the device comprising:
    a fixed plate formed with a slot and having a surface with a plurality of teeth;
    a button assembly comprising:
        a button at least part of which is received in the slot of the fixed plate,
        a first gear rack attached to the button, and
        a resilient layer having a surface that faces the surface of the fixed plate with the plurality of teeth, the surface of the resilient layer configured to (i) deform by contacting at least a subset of the plurality of teeth of the fixed plate for locking the button assembly to the fixed plate, and (ii) recover from the deformation by disengaging from the at least a subset of the plurality of teeth to unlock the button assembly from the fixed plate;
    a spring configured to bias the button assembly towards the fixed plate and press the resilient layer against the plurality of teeth; and
    a first gear meshing with the first gear rack of the button assembly.

2. The device of claim 1, wherein the plurality of teeth of the fixed plate are configured to disengage the resilient layer of the button assembly and enable movement of the button assembly relative to the fixed plate responsive to pressing of the button away from the fixed plate beyond a threshold distance.

3. The device of claim 2, wherein the movement of the button rotates the first gear, the rotating of the first gear causing a movement of a first display assembly relative to a second display assembly that changes the interpupillary distance in the head-mounted display.

4. The device of claim 3, wherein the first display assembly comprises:
a first display socket;
a first electronic display attached to one end of the first display socket and configured to display images; and
a second gear rack meshing with the first gear to move the first display assembly responsive to rotating of the first gear.

5. The device of claim 4, further comprising:
the second display assembly comprising a second display socket and a second electronic display attached to one end of the second display socket and configured to display images; and
a second gear between a rack arm of the first display assembly and a rack arm of the second display assembly to move the first and second display assemblies in a symmetric manner responsive to rotating of the first gear.

6. The device of claim 3, wherein the rotation of the first gear causes linear motions of the first display assembly and the second display assembly.

7. The device of claim 6, further comprising a first shaft along which the first display assembly and the second display assembly move.

8. The device of claim 7, further comprising a second shaft along which the first display assembly and the second display assembly move, the first shaft slidably attached to upper portions of the first and second display assemblies, the second shaft slidably attached to lower portions of the first and second display assemblies.

9. The device of claim 1, further comprising a sleeve received in the button and enclose at least part of the spring.

10. The device of claim 1, wherein the device is located at a side of the head-mounted display and with the button exposed to enable pushing of the button by a user.

11. The device of claim 1, wherein the movement of the button relative to the fixed plate is linear motion.

12. The device of claim 1, wherein the button is configured to move linearly along the slot that causes linear movement of the first gear rack, wherein the linear movement of the first gear rack drives the first gear to rotate, and wherein the rotation of the first gear causes a linear movement of a first display assembly relative to a second display assembly that changes the interpupillary distance in the head-mounted display.

* * * * *